United States Patent [19]

Sekiya et al.

[11] Patent Number: 4,912,571
[45] Date of Patent: Mar. 27, 1990

[54] A MEMORY CONTROLLING APPARATUS FOR A MAGNETIC RECORDING AND REPRODUCING APPARATUS

[75] Inventors: Masataka Sekiya, Mito; Hideo Nishijima, Katsuta; Kaneyuki Okamoto, Katsuta; Michio Masuda, Katsuta; Jun Kobayashi, Katsuta, all of Japan

[73] Assignee: Hitachi, Ltd., Tokyo, Japan

[21] Appl. No.: 81,446

[22] Filed: Aug. 4, 1987

[30] Foreign Application Priority Data

Aug. 8, 1986 [JP] Japan .................................. 61-185098

[51] Int. Cl.4 ............................................ H04N 5/783
[52] U.S. Cl. .................................. 360/10.3; 358/337; 360/70
[58] Field of Search ................... 360/70, 75, 77, 64, 360/10.1, 10.2, 10.3, 33.1, 36.1; 358/335, 337

[56] References Cited

U.S. PATENT DOCUMENTS

| | | | |
|---|---|---|---|
| 4,558,376 | 12/1985 | Heitmann | 360/10.1 |
| 4,594,616 | 6/1986 | Dischert | 360/36.1 |
| 4,636,874 | 1/1987 | Hoogendoorn et al. | 360/10.2 |
| 4,725,898 | 2/1988 | Tokuyama | 360/33.1 |
| 4,731,659 | 3/1988 | Kani | 360/10.1 |
| 4,733,311 | 3/1988 | Yoshinaka | 360/36.1 |
| 4,733,312 | 3/1988 | Morimoto | 360/10.1 |

Primary Examiner—Aristotelis M. Psitos
Assistant Examiner—David L. Robertson
Attorney, Agent, or Firm—Antonelli, Terry & Wands

[57] ABSTRACT

A memory controlling apparatus for a magnetic recording and reproducing apparatus which records and reproduces a field image signal in each read or write cycle performed by a video head for reproducing the image signal from a magnetic tape, and by a video head position detector for detecting the position of the video head. A reference circuit obtains a signal defining a reference timing which is independent of the position of the video head and which is also used to determine the phase of the video head. A memory is provided having storage sufficient to store the field image signal, and a controller is provided for controlling the operation of reading and writing the image signal from and into the memory. The controller is synchronized with a signal of the video head position detector when storing the image signal into the memory and when reading out the image stored in the memory, the controller and the head position detector are synchronized with the reference timing so as to enable production of a slow-motion image signal free from fluctuations caused by feeding of the magnetic tape.

6 Claims, 4 Drawing Sheets

A MEMORY CONTROLLING APPARATUS FOR A MAGNETIC RECORDING AND REPRODUCING APPARATUS

BACKGROUND OF THE INVENTION

1. Field of the Invention

The present invention relates to a magnetic recording and reproducing apparatus and, more particularly, to a slow-motion device for use in a magnetic recording and reproducing apparatus which is suitable for effecting noiseless slow-motion reproduction using a memory.

2. Description of the Prior Art

In the conventional helical can type magnetic recording and reproducing apparatus designed to record and reproduce an image signal on and from a magnetic tape in an amount which corresponds to one field in each read or write cycle, slow-motion reproduction is enabled by intermittently feeding the tape for each field of the recording pattern as described in Japanese patent laid-open No. 2018/1979 which corresponds to U.S. Pat. No. 4,190,869. However, in order to realize unblurred noiseless slow-motion reproduction with this type of prior art, it is, as is well known, necessary to enable high precision intermittent drive and employ a complicated head arrangement, an the control of the intermittent drive is considerably complicated. Further, intermittent feed of the tape causes variation of period in the horizontal and vertical synchronizing signals for reproduction through the repetitive stop and feed of the tape, resulting in the reproduced image being oscillated horizontally and vertically. Compensation for these oscillations also needs a complicated system, and it has heretofore been difficult to completely eliminate the oscillations of the reproduced image.

Thus, the prior art of the type described above suffers from the problem that, in order to realize unblurred noiseless slow-motion by reproducing the image signal for one field only in each read cycle, it is necessary to provide a complicated head arrangement, intermittent drive control means and a compensating system for eliminating horizontal and vertical swings of the reproduced image due to the variation of period in the horizontal and vertical synchronizing signals during the intermittent drive.

The above-described problems may be overcome by storing a memory with a steady image signal for one field during each stop of the intermittent drive and repeatedly reading the stored image signal during the feed of the tape in the intermittent drive.

In this case, the signal which determines the start point for reading and writing the image signal for one field must be synchronized with a point which corresponds to a blanking point that does not appear on the TV screen in order to obtain a continuous image, and the signal must also be synchronized with the reproduced image signal because the image signal is stored in the memory in synchronism with the intermittent drive.

Examples of the signals which satisfy the above-described requirements may be the vertical synchronizing signal reproduced from the magnetic tape and a signal for switching the video head for recording and reproducing the image signal such as that specified in the VHS standard for VTR.

However, these signals suffer from variation of period during the intermittent drive and cannot represent the length of one field from the point of time when the image signal has been stored in the memory. Therefore, if these signals are used, the reproduced image may be skewed or shifted vertically. Accordingly, when a memory is used for the above-described purposes, these problems must be taken into consideration.

SUMMARY OF THE INVENTION

It is a primary object of the present invention to obtain a steady image signal by controlling the operation of reading and writing the image signal from and into the memory using a controller which is arranged such that, when the signal output from the memory is not needed, the controller is synchronized with the head switching signal or the vertical synchronizing signal, whereas, when the memory output signal is used, the controller is activated so as to operate at the same period as that of a reference signal for controlling a rotary drum having the video head installed thereon.

To this end, the present invention provides a magnetic recording and reproducing apparatus designed to record and reproduce an image signal on and from a magnetic tape in an amount that corresponds to a predetermined unit of image in each read or write cycle, which comprises: a video head for reproducing the image signal from the magnetic tape; video head position detecting means for detecting the position of the video head; a rotary drum having the video head installed thereon; rotary drum control means for controlling the rotation of the rotary drum; reference circuit means for obtaining a signal defining a reference used to determine the phase of the video head; a memory element sufficient to store the image signal obtained from the video head in an amount corresponding to the predetermined unit of image; means for storing the image signal for the predetermined unit of image in the memory element; control means for controlling the operation of reading and writing the image signal from and into the memory element; means for synchronizing the control means with the video head position detecting means when the rotary drum control means is controlling the rotary drum on the basis of the signals respectively output from the reference circuit means and the video head position detecting means and the signal output from the memory element is not used; and means for activating the control means so as to operate at the same period as that of the reference circuit means when the rotary drum control means is controlling the rotary drum on the basis of the signals respectively output from the reference circuit means and the video head position detecting means and the signal output from the memory element is used.

DETAILED DESCRIPTION OF THE PREFERRED EMBODIMENTS

The outline and function of one embodiment of the present invention will first be described. According to the present invention, there is provided a counter which is initialized in response to a head switching signal in the normal reproduction mode and which is activated so as to operate at the same period as that of a cylinder motor in the slow-motion reproduction mode, so that an amount of image signal corresponding to a predetermined unit of image, e.g., one field, is stored in the memory from a start point which is set by the counter after intermittent drive has been completed and it has become possible to obtain a steady image signal. After the storage of the signal, the signal stored in the memory is read out from a point of time which is set by the same counter, and the above-described operation is repeated from a point of time when the subsequent intermittent drive has been completed and it has become possible to obtain a steady image signal, thereby achieving slow-motion reproduction which is free from vertical and horizontal swings.

The counter which provides references on the basis of which the read and write operation in relation to the memory are carried out is initialized in the normal reproduction mode and activated so as to operate at the same period as that of the rotation of the cylinder motor. Thus, the starting timing for each of the read and write operations in relation to the memory is set on the basis of the operation of this counter. In a state wherein a steady image signal can be obtained after intermittent drive has been completed, the start timing is determined on the basis of the operation of the counter to store an amount of image signal which corresponds to one field, and the data stored in the memory is output on the basis of the timing set by the counter until an image signal is obtained after the subsequent intermittent drive. Accordingly, any unsteady image signal which may be generated during intermittent drive is prevented from being output to the outside, and a steady image signal is output from the memory on the basis of the timing determined by the counter. Thus, it is possible to obtain an image signal which is free from vertical and horizontal swings.

Figure 1:
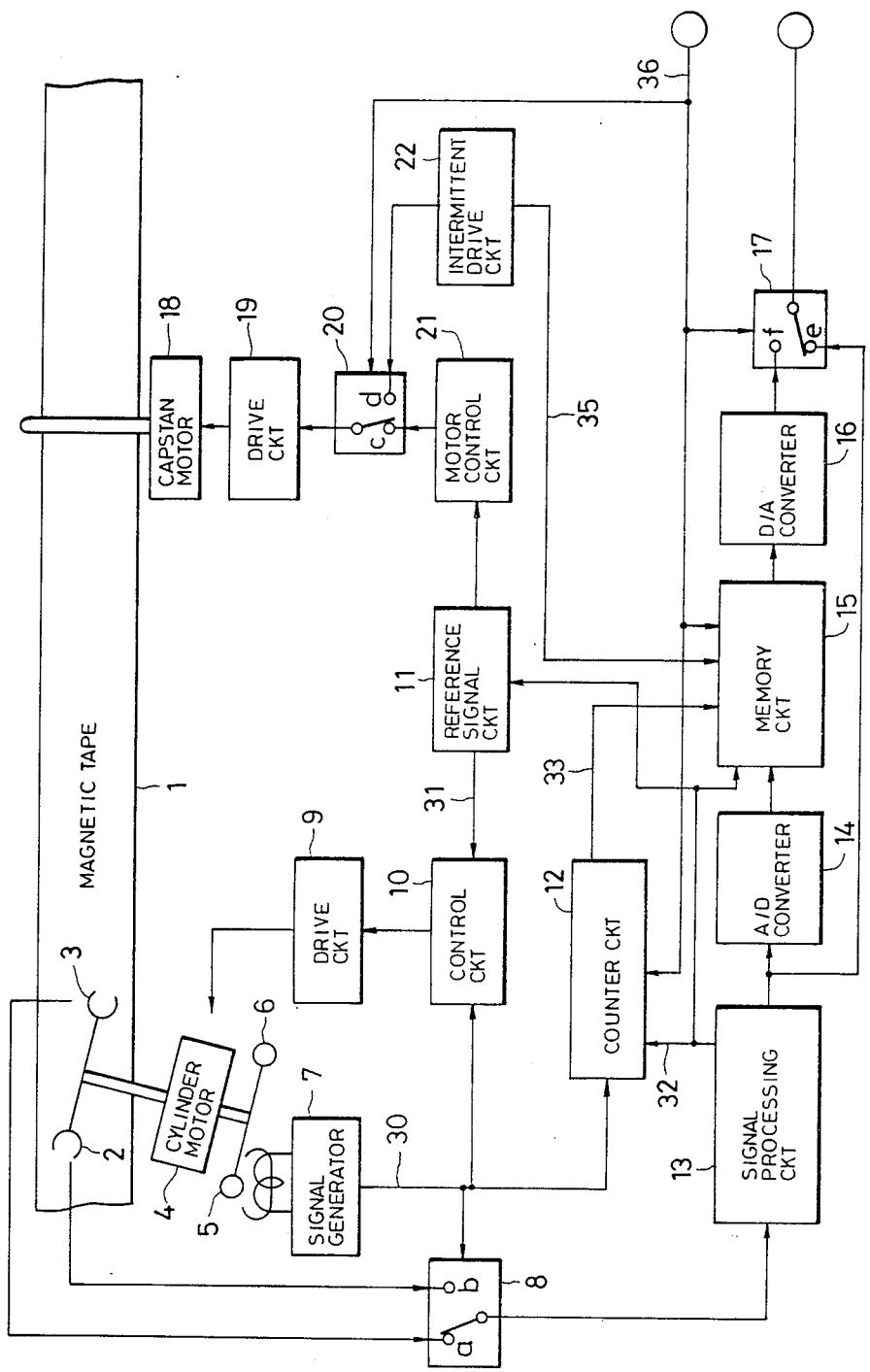
FIG. 1 is a block diagram of one embodiment of the present invention.

One embodiment of the present invention will be described hereinunder in detail with reference to the accompanying drawings. Referring first to FIG. 1, the reference numeral 1 denotes a magnetic tape, 2, 3 video heads, 4 a cylinder motor, 5, 6 magnets, 7 a head switching signal generator, 8, 17, 20 switches, 9, 19 drive circuits, 10 a control circuit, 11 a reference signal circuit, 12 a counter circuit, 13 a signal processing circuit, 14 an A/D converter, 15 a memory circuit, 16 a D/A converter, 18 a capstan motor, 21 a motor control circuit, 22 an intermittent drive circuit, and 30, 31, 32, 33, 35, 36 signals.

In operation, the control circuit 10 controls the cylinder motor 4 through the drive circuit 9 so that the motor 4 is rotated at a predetermined speed, and the control circuit 10 also effects control so that the signal 30 is phase-locked with respect to the reference signal 31 which is output from the reference signal circuit 11. The video heads 2 and 3 are arranged to rotate together with the cylinder motor 4 and adapted to alternately reproduce the signal recorded on the magnetic tape 1 and output the read signals to the switch 8. The switch 8 is activated in response to the signal 30 so as to form the signals from the video heads 2 and 3 into one serial signal. This signal is then converted into an image signal in the signal processing circuit 13. The signal 30 is formed by the cooperation of the head switching signal generator 7 and the magnets 5, 6 which are installed so as to rotate together with the cylinder motor 4 and to indicate the positions of the video heads 2 and 3, respectively. The signal 30 is employed to select either one of the video heads 2 and 3 tracing the magnetic tape 1.

The signal 36 is a slow-motion reproduction command which is normally at the low level to connect the switch 17 to the terminal e. Accordingly, the signal output from the signal processing circuit 13 is output to the outside via the switch 17.

The signal 36 also controls the switch 20 so that the switch 20 is connected to the terminal c when the signal 36 is at the low level. The capstan motor 18 is controlled by the motor control circuit 21 through the drive circuit 19 so that the motor 18 is rotated at a predetermined speed to drive the magnetic tape 1.

When a slow-motion reproduction instruction is issued from the user, the signal 36 is raised to the high level. In consequence, the switch 20 is connected to the terminal d, and the capstan motor 18 is caused to feed the magnetic tape 1 intermittently under the control of the intermittent drive circuit 22. Accordingly, the video heads 2 and 3 change the tracks from which they are to reproduce signals every time the tape 1 is fed intermittently. Further, the signal 36 changes the position of the switch 17 from the terminal e to the terminal f, thus allowing the signal from the D/A converter 16 to be output to the outside.

The intermittent drive circuit 22 is similar to the system described in Japanese patent laid-open No. 2018/1979 which corresponds to U.S. Pat. No. 4,190,869 mentioned as a prior art and therefore description of the arrangement thereof is omitted.

Figure 2:
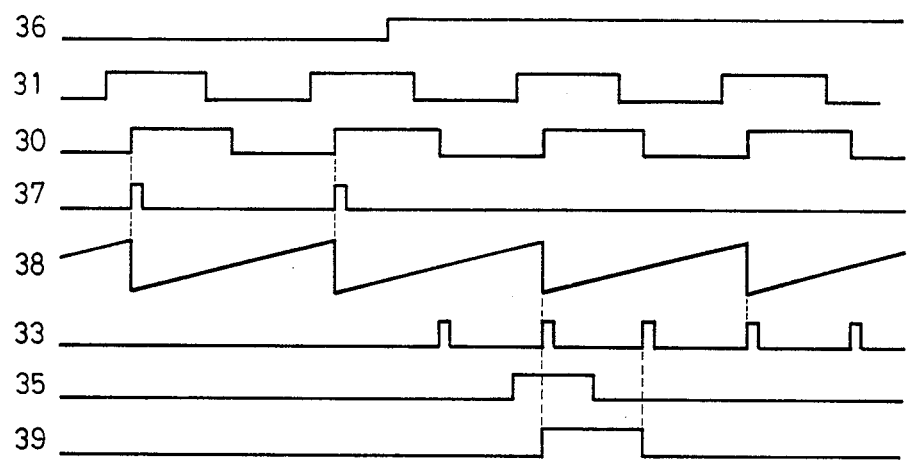
FIG. 2 is a waveform chart showing signals at essential portions in the embodiment.

The counter circuit 12 and the memory circuit 15 will next be explained with reference to FIG. 2 which is a waveform chart showing signals at essential portions of the arrangement shown in FIG. 1. In FIG. 2, the reference numeral 37 represents an internal signal used inside the counter circuit 12, while 38 schematically shows the count of the counter in the counter circuit 12, and 39 represents an internal signal used in the memory circuit 15.

The counter circuit 12, when the signal 36 is at the low level, is initialized in response to the signal 37 which is generated synchronously with the leading edge of the signal 30, and the counter circuit 12 operates in the manner shown by the count 38.

When the signal 36 is raised to the high level, the signal 37 is fixed to the low level, so that the initialization of the counter circuit 12 is suspended. The counter circuit 12 counts the same clocks as those which are counted by the reference signal circuit 11 and repeats the counting operation at the same period as that of the reference signal circuit 11. More specifically, the counter circuit 12 operates with a predetermined phase difference with respect to the signal 31 at all times. Accordingly, since the signal 30 is controlled so as to be phase-locked with respect to the signal 31 as described above, even if the period of the signal 30 is changed because the cylinder motor 4 is oscillated by the magnetic tape 1 which is fed intermittently during the slow-motion reproduction mode, the counter circuit 12 indicates a point where the leading edge of the signal 30 should be phase-locked with respect to the signal 31 in a steady state of the magnetic tape 1.

The counter circuit 12 generates the signal 33 which has pulses at two points, i.e., a first point that indicates the leading edge of the signal 30 and a second point that is behind the first point by a period of time which corresponds to one field. The signal 33 is input to the memory circuit 15.

On the other hand, the intermittent drive circuit 22 causes the capstan motor 19 to be driven intermittently and further outputs the signal 35 which enables writing of the image signal when the control system has returned to the steady state after intermittent drive. A judgement as to whether or not the control system has become steady can readily be made by measuring the time after intermittent drive has been completed, and therefore description thereof is omitted herein.

In the memory circuit 15, the signal 35 is shaped into the signal 39 by the use of the signal 33. The period during which the signal 39 is at the high level is the write period for the memory circuit 15, while the period during which the signal 39 is at the low level is the read period for the memory circuit 15. At this time, the signal output from the signal processing circuit 13 is digitalized in the A/D converter 14 and, when the signal 39 is at the high level, the digitalized signal is written into the memory circuit 15 and, at the same time, converted into an analog signal in the D/A converter 16 and output to the outside via the switch 17, whereas, when the signal 39 is at the low level, the signal read out from the memory circuit 15 is output to the outside in the same way.

Figure 3:
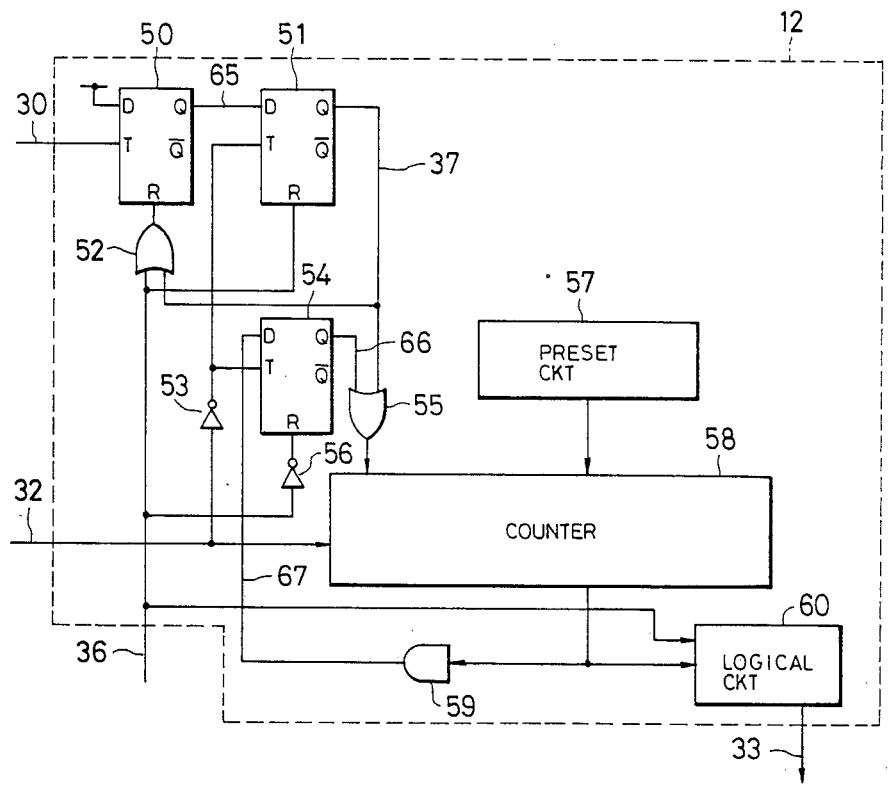
FIG. 3 is a block diagram showing in detail the counter circuit shown in FIG. 1.

The counter circuit 12 will be described in detail with reference to FIG. 3. In FIG. 3, the reference numerals 50, 51 and 54 denote resettable T flip-flops (hereinafter referred to as "TFFs"), 52, 55 OR gates, 53, 56 inverters, 57 a preset circuit, 58 a counter, 59 an AND gate, 60 logical circuits, and 65 to 67 signals.

Figure 4:
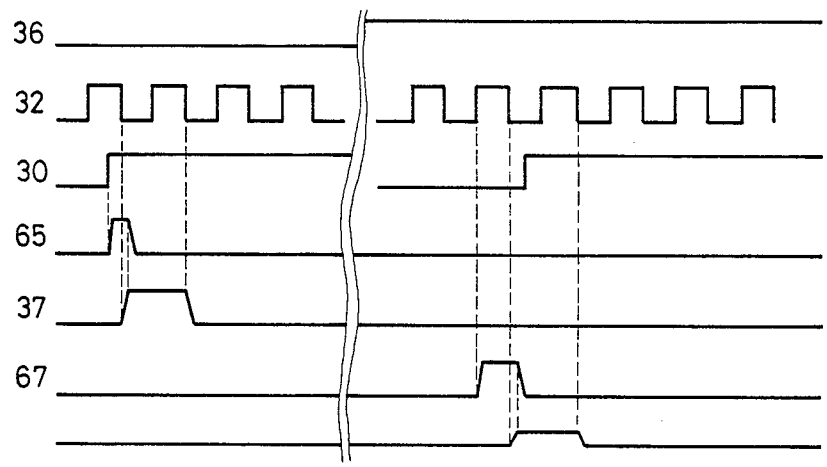
FIG. 4 is a waveform chart showing signals at essential portions of the arrangement shown in FIG. 3.

When the signal 36 is at the low level, the signal 33 is fixed to the low level, and the TFF 51 is released of reset, while the TFF 54 is reset because the signal 36 is input thereto through the inverter 56, so that the signal 66 is at the low level. The reference numeral 32 denotes a clock signal which is input to the counter 58 and also to the TFFs 51 and 54 through the inverter 53. Assuming that the initial state of the Q output of each of the TFFs 50 and 51 is the low level (i.e., the signals 65 and 37 are at the low level), the operation of the counter circuit 12 will be described with reference to FIG. 4 which is a waveform chart showing signals at essential portions of the arrangement shown in FIG. 3.

The TFF 50 samples the state of the D terminal in synchronism with the rise of the signal 30. Since the D terminal is at the high level, the signal 65 is shifted from the low level to the high level. The TFF 51 samples the signal 65 in synchronism with the fall of the signal 32, and the signal 37 is consequently raised to the high level. Since the signal 37 is input to the reset terminal of the TFF 50 through the OR gate 52, when the signal 37 becomes high in level, the signal 65 is shifted to the low level. The TFF 51 samples the signal 65 again, and the signal 37 is shifted to the low level. Thus, the TFF 50 and 51 are returned to their initial states to await the input of the next leading edge of the signal 30.

The signal 37 is also input to the counter 58 through the OR gate 55. During the period when the signal 37 is at the high level, the counter 58 is set to a value specified by the preset circuit 57. The counter 58 counts the number of rises of the clock signal 32, but the output of the logical circuits 60 is fixed to the low level by the signal 36. Although the AND gate 59 outputs a high-level signal when all the outputs of the counter 58 are high in level, since the TFF 54 is in a reset state, the AND gate 59 does not contribute to the operation.

When the signal 36 is at the low level, the above-described operation is repeated.

When the signal 36 is raised to the high level, the logical circuits 60 are allowed to output pulses in the form of the signal 33 in accordance with the count of the counter 58, while the TFF 50 and 51 are reset, and the signals 65 and 37 are fixed to the low level. On the other hand, the TFF 54 is released of reset. When all the outputs of the counter 58 are high in level, the signal 677 output from the AND gate 59 is raised to the high level. The TFF 54 samples the signal 67 in synchronism with the fall of the clock signal 32 to obtain the signal 66. In response to this signal 66, the counter 58 is set to the value specified by the present circuit 57. After the setting, the signal 67 is shifted to the low level, and the signal 66 is also shifted to the low level in synchronism with the subsequent fall of the signal 32. The counter 58 starts counting in synchronism with the rise of the clock signal 32, and when all the outputs of the counter 58 are high in level, the above-described operation is repeated. The value which is specified by the present circuit 15 is set so that the counter 58 performs the above-described operation at the same period as that of the signal 30 which is output from the reference signal circuit 11.

The counted values output form the counter 58 are ORed in the logical circuits 60 so that pulses are respectively generated at two points, i.e., a first point corresponding to the initialization and a second point which is behind the first point by a period of time that corresponds to one field, and the logical circuits 60 output the result of the O-Ring in the form of the signal 33 to the memory circuit 15.

Figure 5:
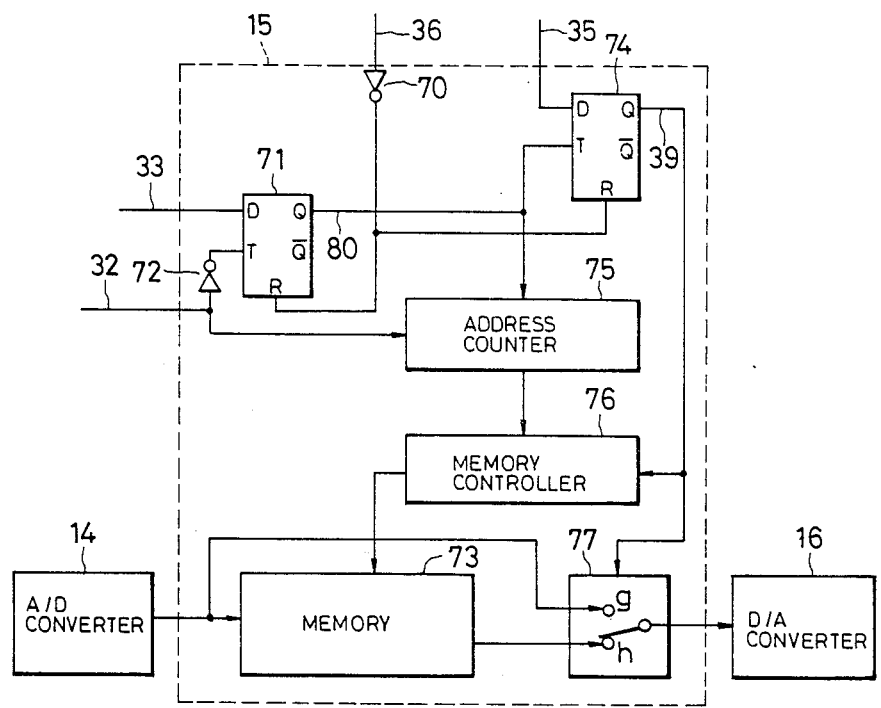
FIG. 5 is a block diagram showing in detail the memory circuit shown in FIG. 1.
Figure 6:
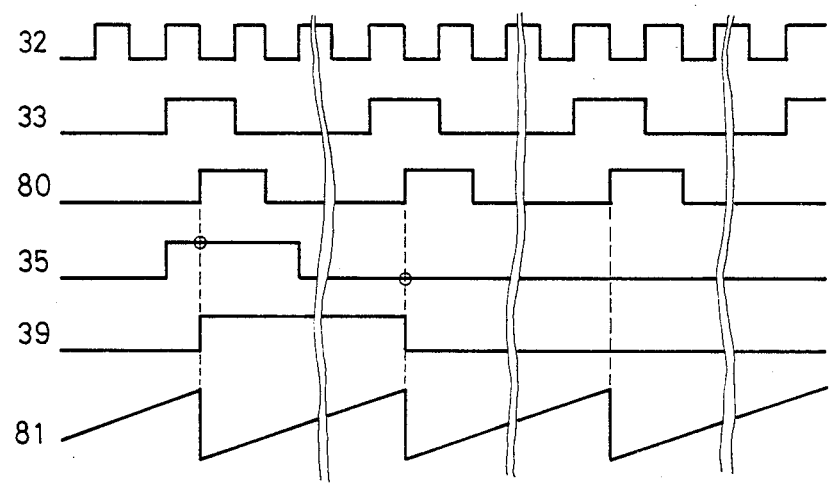
FIG. 6 is a waveform chart showing signals at essential portions of the arrangement shown in FIG. 5.

The status of operation of the memory circuit 15 in accordance with the signal 33 will be explained with reference to FIGS. 5 and 6. In FIG. 5, the reference numerals 70 and 72 denote inverters, 71, 74 TFFs, 73 a memory, 75 an address counter, 76 a memory controller, 77 a switch, and 80 a signal, while the numeral 81 in FIG. 6 schematically shows the count of the address counter 75. It is assumed that the memory 73 is a widely used general-purpose RAM of the type wherein a memory element into which data is to be written is specified with an address.

When the signal 36 is at the low level, the TFFs 71 and 75 are in a reset state and therefore do not accept the signal 33. However, when the signal 36 is raised to the high level, the TFF 71 is enabled to sample the signal 33 in response to the inverted signal which is formed in the inverter 72 by inverting the signal 32. Since the signal 33 is the OR of the output signals of the counter 58 as described above, as shown by the signal 33 in FIG. 6, the signal 33 changes in synchronism with the rise of the signal 32 and is sampled by the TFF 71 in synchronism with the fall of the signal 32 to obtain the signal 80.

The signal 80 resets the address counter 75 see 81 in FIG. 6). The address counter 75, after releasing of reset, is allowed to count up in synchronism with the rise of the clock signal 32 to thereby specify through the memory controller 76 a memory element in the memory 73 to or from which data is to be written or read.

The signal 80 is also input to the TFF 74 to sample the signal 35. In the TFF 74, the signal 35 is shaped into the signal 39 on the bass of the signal 80. The signal 39 indicates a period during which a steady image signal can be obtained, the period corresponding to one field. The signal 39 controls through the memory controller 76 the operation of reading and writing data (the output of the A/D converter 14) in relation to the memory 73. It is assumed that, when the signal 39 is at the high level, writing of data is carried out, whereas, when the signal 39 is at the low level, reading of data is performed. In the case where the memory 73 does not enable reading and writing at the same time, when data is being written, o output is obtained. Therefore, when the signal 39 is at the high level, the position of the switch 77 is changed from the terminal h to the terminal g, whereby the output signal from the A/D converter 14 is transmitted to the D/A converter 16 and output to the outside as an image signal. When the signal 39 is at the low level, the memory 73 is in the read mode, and the switch 77 is connected to the terminal h. Thus, the data stored in the memory 73 is output to the outside through the data converter 16. In this way, a steady image signal can be read from and written into the memory 73 in an amount which corresponds to one field.

As has been described above, in the normal reproduction mode, the counter circuit 12 is initialized in response to the head switching signal 30, whereas, when the slow-motion reproduction mode is started, the initialization is suspended, and the data reading and writing operations in relation to the memory circuit 15 are controlled on the basis of the signal 33, whereby it is possible to obtain a steady image signal which is free from swings, skew and vertical shift.

Although in the above-described embodiment the initialization of the counter circuit 12 is effected in synchronism with the rise of the head switching signal, the fall or both leading and trailing edges of the signal may also be used for the initialization. In the described embodiment, the rise of the head switching signal is employed in order to find a vertical blanking point which does not appear on the TV screen; therefore, the initialization may also be effected on the basis of the vertical synchronizing signal.

Further, although the present invention has been described by way of example in which it is applied to the slow-motion reproduction mode, the invention is apparently effective in the other modes.

According to the present invention, it is possible to obtain a stable reference signal for read and write by means of a counter in the slow-motion reproduction effected using a one-field memory. Accordingly, it is possible to obtain a reproduced image which is free from swings.

What is claimed is:

1. A memory controlling apparatus for a magnetic recording and reproducing apparatus driven by a magnetic tape driving means for enabling recording and reproduction of an image signal on and from a magnetic tape in an amount that corresponds to a predetermined unit of image in each read or write cycle, the magnetic tape driving means enabling different feed modes of the magnetic tape including an intermittent drive, comprising:

video head means for reproducing the image signal from the magnetic tape;
video head position detecting means for detecting the position of the video head means and providing a signal indicative thereof;
a rotary drum having the video head means installed thereon;
rotary drum control means for controlling the rotation of the rotary drum;
reference circuit means for obtaining a signal defining a reference timing which is independent of the signal provided by the video head position detecting means and for enabling determination of the phase of the video head means;
memory means for storing the image signal obtained from the video head means in an amount corresponding to the predetermined unit of image;
control means for controlling reading and writing and the image signal from and into the memory means; and
means for synchronizing the control means to the detected signal of the video head position detecting means when storing the image signal into the memory means and for synchronizing the control means and the video head position detecting means on the rotary drum to the reference timing signal when reading out the signal stored in the memory means;
the control means enabling writing in the memory means an amount of the predetermined unit of image from a start point and with a timing provided by the reference circuit means when obtaining of a steady image signal has become possible after an intermittent drive of the magnetic tape driving means so that the amount of the predetermined unit of the image is stored in the memory means, and for enabling reading out the amount of the predetermined unit of the image stored in the memory means with the timing provided by the reference circuit means and with the output signal of the memory means being utilized as an image in a slow-motion thereby enabling a slow-motion reproduction which is substantially free from vertical and horizontal swings and fluctuations caused by the feeding of the magnetic tape and detection and providing of signals by the video head means and the video head position detecting means.

2. A memory controlling apparatus according to claim 1, wherein the synchronizing means synchronizes the control means with the video head position detecting means prior to a change of the feed mode of the magnetic tape by the magnetic tape driving means and after a change of the feed mode of the magnetic tape, the control means operates at the same period as that of the reference circuit means.

3. A memory controlling apparatus according to claim 2, wherein prior to the change of the feed mode of the magnetic tape, the magnetic tape driving means enables a normal reproduction to be effected, and after a change of the feed mode of the magnetic tape, the magnetic tape driving means effects an intermittent drive.

4. A memory controlling apparatus according to claim 1, wherein the predetermined unit of the image is one field.

5. A memory controlling apparatus according to claim 1, wherein the reference circuit means includes means for counting clock signals and enables obtaining of the reference timing in accordance with the counting of the clock signals.

6. A memory controlling apparatus according to claim 1, further comprising, means for suspending the synchronization of the control means with the video head position detecting means by the synchronizing means when the signal output from the memory means is utilized.

* * * * *